(12) United States Patent
Shibata

(10) Patent No.: US 6,997,091 B1
(45) Date of Patent: Feb. 14, 2006

(54) CIRCULAR SAW

(75) Inventor: Yoshinori Shibata, Anjo (JP)

(73) Assignee: Makita Corporation, Anjo (JP)

( * ) Notice: Subject to any disclaimer, the term of this patent is extended or adjusted under 35 U.S.C. 154(b) by 0 days.

(21) Appl. No.: 09/115,654

(22) Filed: Jul. 15, 1998

(30) Foreign Application Priority Data

Jul. 22, 1997 (JP) .................................. 9-195840

(51) Int. Cl.
*B27B 5/20* (2006.01)
*B23D 45/02* (2006.01)

(52) U.S. Cl. ........................ 83/399; 83/471.3; 83/485; 83/486.1; 83/490

(58) Field of Classification Search .................. 83/485, 83/486, 486.1, 471.3, 399, 471.2, 473, 483, 83/487–490, 581, DIG. 1
See application file for complete search history.

(56) References Cited

U.S. PATENT DOCUMENTS

| | | | |
|---|---|---|---|
| 4,257,297 A | | 3/1981 | Nidbella ..................... 83/471.3 |
| 4,587,875 A | * | 5/1986 | Deley ..................... 83/486.1 X |
| 4,641,557 A | * | 2/1987 | Steiner et al. ......... 83/471.3 X |
| 4,869,142 A | * | 9/1989 | Sato et al. ............. 83/471.3 X |
| 5,060,548 A | * | 10/1991 | Sato et al. ................. 83/471.3 |
| 5,287,780 A | * | 2/1994 | Metzger et al. ........... 83/399 X |
| 5,437,214 A | | 8/1995 | Sasaki et al. .............. 83/471.3 |
| 5,660,094 A | | 8/1997 | Sasaki et al. .............. 83/471.3 |
| 5,862,732 A | * | 1/1999 | Itzov ..................... 83/486.1 X |
| 5,931,073 A | * | 8/1999 | Hoyer-Ellefsen ........... 83/471.3 |
| 6,170,373 B1 | * | 1/2001 | Sasaki et al. ................. 83/485 |

* cited by examiner

*Primary Examiner*—Clark F. Dexter
(74) *Attorney, Agent, or Firm*—Dennison, Schultz, Dougherty & MacDonald

(57) ABSTRACT

A circular saw includes a table having an upper surface for placing a workpiece thereon. A saw unit has a saw blade mounted thereon and is supported on the table such that the saw unit is movable in a horizontal direction parallel to the upper surface of the table and is movable in a vertical direction perpendicular to the upper surface of the table. At least one of a first lock device and a second lock device is provided. The first lock device is operable to prevent the saw unit from moving in the horizontal direction in response to the movement of the saw unit in the vertical direction. The second lock device is operable to prevent the saw unit from moving in the vertical direction in response to the movement of the saw unit in the horizontal direction.

48 Claims, 9 Drawing Sheets

CIRCULAR SAW

FIELD OF THE INVENTION

The present invention relates to circular saws, such as miter saws, which have a table for placing thereon a workpiece to be cut, and which have a saw unit that includes a saw blade and that is horizontally and vertically movable relative to the table.

DESCRIPTION OF THE RELATED ART

In circular saws of this type, when a workpiece is to be cut by lowering a saw unit toward a table or when a cutting operation known as a chopping operation or a miter cutting operation is performed, the position of the saw unit in the horizontal direction preferably should be fixed by using a fixing device, such as a fixing bolt disclosed in U.S. Pat. No. 5,437,214.

However, manually tightening a fixing bolt to fix the horizontal position of the saw unit every time that a cutting operation is performed or every time after the miter saw unit is set at an appropriate horizontal position above the workpiece is both troublesome and time consuming. As a result, circular saws of this type possess a substantial hindrance in operability. If the cutting operation is performed without tightening the fixing bolt, the saw unit is free to move or slide in the horizontal direction. Therefore, a reaction force may be applied to the saw unit in response to the workpiece contacting the rotating saw blade, such that the reaction force pushes the saw unit horizontally toward an operator. In order to counteract this reaction force, the operator is required to hold the saw unit with his hand during the cutting operation, thereby hindering the operation of the saw unit.

A similar problem may be caused when the cutting operation is performed by moving the saw unit in the horizontal direction. In order to perform this cutting operation, the operator must lower the saw unit to a predetermined level such that the lower portion of the saw blade is positioned below the workpiece. The operator then pushes the saw unit horizontally to cut the workpiece. During the horizontal movement of the saw unit, the operator must manually maintain the vertical position of the saw unit, which can provide difficulties for the operator.

SUMMARY OF THE INVENTION

The present invention provides an improved circular saw having a table and a saw unit that is horizontally and vertically movable relative to the table, the saw unit including at least one locking device that improves the operability of the circular saw.

Preferably, the circular saw may include:
 a table having an upper surface for placing a workpiece thereon;
 a saw unit having a saw blade mounted thereon;
 a support device for supporting the saw unit on the table such that the saw unit is movable in a horizontal direction parallel to the upper surface of the table and is movable in a vertical direction relative to the upper surface of the table; and
 at least one of a first lock device and a second lock device, the first lock device being operable to prevent the saw unit from moving in the horizontal direction in response to the movement of the saw unit in the vertical direction, and the second lock device being operable to prevent the saw unit from moving in the vertical direction in response to the movement of the saw unit in the horizontal direction.

If the first lock device is provided according to a first embodiment, the operator can perform a chopping operation without the need to manually fix the saw unit in the horizontal position and without the need to hold the saw unit in the horizontal direction against the reaction force generated by the saw blade contacting the workpiece. Therefore, the chopping operation can be smoothly and easily performed if the first lock device is utilized.

Preferably, the first lock device includes a fixing member that is operable to fix the saw unit in position relative to the table in the horizontal direction, an actuator for operating the fixing member, and a sensor device for detecting the vertical movement of the saw unit.

In addition, the support device may include, for example, a support arm mounted on the table, a slide member horizontally slidable relative to the support arm, and a hinge device for vertically pivotally connecting the saw unit to the slide member. In such a case, the fixing member is operable to fix the slide member in position relative to the support arm, and the sensor device can detect the vertical pivotal movement of the saw unit relative to the slide member.

Preferably, the slide member is a slide shaft that is slidably inserted into a holder provided on the support arm. In such a case, the fixing member may be a screw that is inserted into a threaded hole formed in the holder in a direction perpendicular to the axial direction of the slide shaft. The screw preferably has one end for abutting the slide shaft. The actuator may serve to rotate the screw in both clockwise and counterclockwise directions so as to move the screw toward and away from the slide shaft. In order to protect the actuator and the screw from the outside environment, a dust cover may preferably be mounted on the holder to cover the actuator and screw.

The sensor device preferably may include a detector plate mounted on the slide shaft and an optical sensor mounted on the saw unit opposite of the detector plate or vice versa. A plurality of parallel identification bars may be marked on the detector plate and may be spaced from each other by a predetermined distance. A light source is directed towards the bars and the optical sensor can detect the movement of the bars as a changing light/dark pattern. If the optical sensor detects the vertical movement of the saw unit relative to the table, a signal is provided to the actuator and the actuator will rotate the screw to abut the slide shaft. As a result of this operation, the saw unit is fixed in the horizontal direction while the saw unit is moving in the vertical direction.

In a second embodiment, the second lock device may be provided in the circular saw and may preferably include a fixing member that is operable to fix the saw unit in position relative to the table in the vertical direction, an actuator for operating the fixing member, and a detector for detecting the horizontal movement of the saw unit.

If the second lock device is provided, the operator can perform a cutting operation while the saw unit is moved in the horizontal direction, without the need to manually hold the saw unit in position in the vertical direction. Therefore, the cutting operation can be smoothly and easily performed.

In this second embodiment, the support device preferably includes a support arm mounted on the table, a slide member horizontally slidable relative to the support arm, and a hinge device for vertically pivotally connecting the saw unit to the slide member, as was generally described in connection with the first embodiment. The fixing member is preferably operable to fix the pivotal position of the saw unit relative to the slide member, and the sensor device detects the horizontal sliding movement of the slide member relative to the support arm.

Further, if the slide member is a slide shaft that is slidably inserted into a holder provided on the support arm, as was also described in connection with the first embodiment, the fixing member may be a screw that is inserted into a threaded hole formed in the saw unit in a direction parallel to the pivotal axis of the saw unit. The slide shaft may include a flange portion having an abutting surface extending within a plane perpendicular to the pivotal axis of the saw unit, so that one end of the screw abuts the abutting surface of the flange portion. The actuator preferably serves to rotate the screw in both clockwise and counterclockwise directions so as to move the screw toward and away from the abutting surface. In order to protect the actuator and the screw from the outside environment, a dust cover may preferably be mounted on the saw unit to cover the actuator and screw.

As with the sensor device of the first lock device, the sensor device of the second lock device may include a plurality of parallel identification bars marked on the slide shaft and an optical sensor provided on the holder or vice versa. The parallel bars may be spaced from each other by a predetermined distance in the longitudinal direction of the slide shaft. The optical sensor may detect the movement of the parallel bars as a changing light/dark pattern. If the optical sensor detects the horizontal movement of the saw unit relative to the table, a signal is provided to the actuator and the actuator will rotate the screw to abut the abutting surface of the flange portion. As a result of this operation, the saw unit is fixed in a vertical position while the saw unit is moving in the horizontal direction.

Additional features, aspects and advantages of the invention will become more fully apparent from the claims and the description when it is read in connection with the drawings.

DETAILED DESCRIPTION OF THE PREFERRED EMBODIMENTS

A first representative embodiment of the present invention will now be described with reference to FIGS. 1 to 6.

Figure 1:
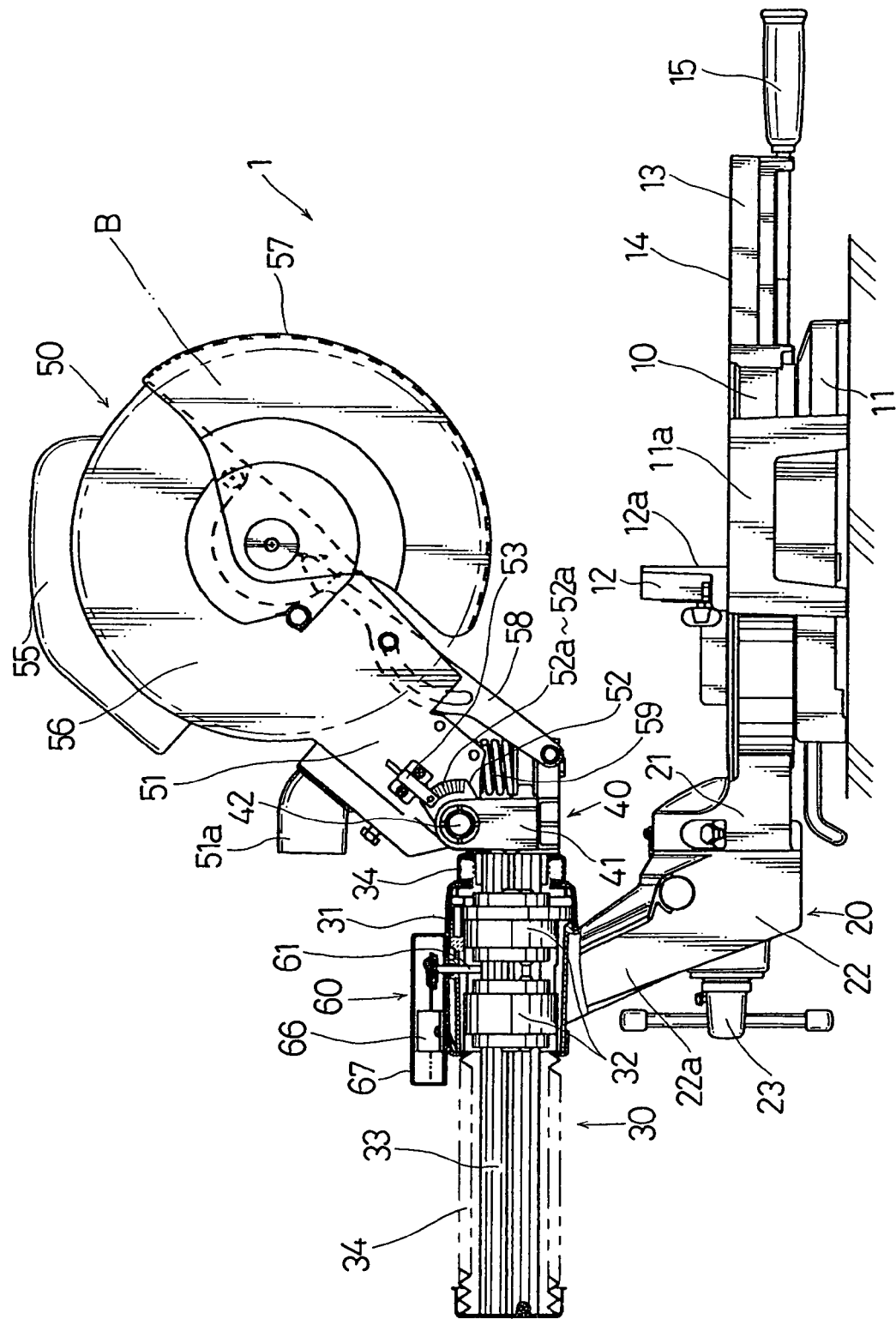
FIG. 1 is a side view of a circular saw according to a first representative embodiment of the present invention.
Figure 2:
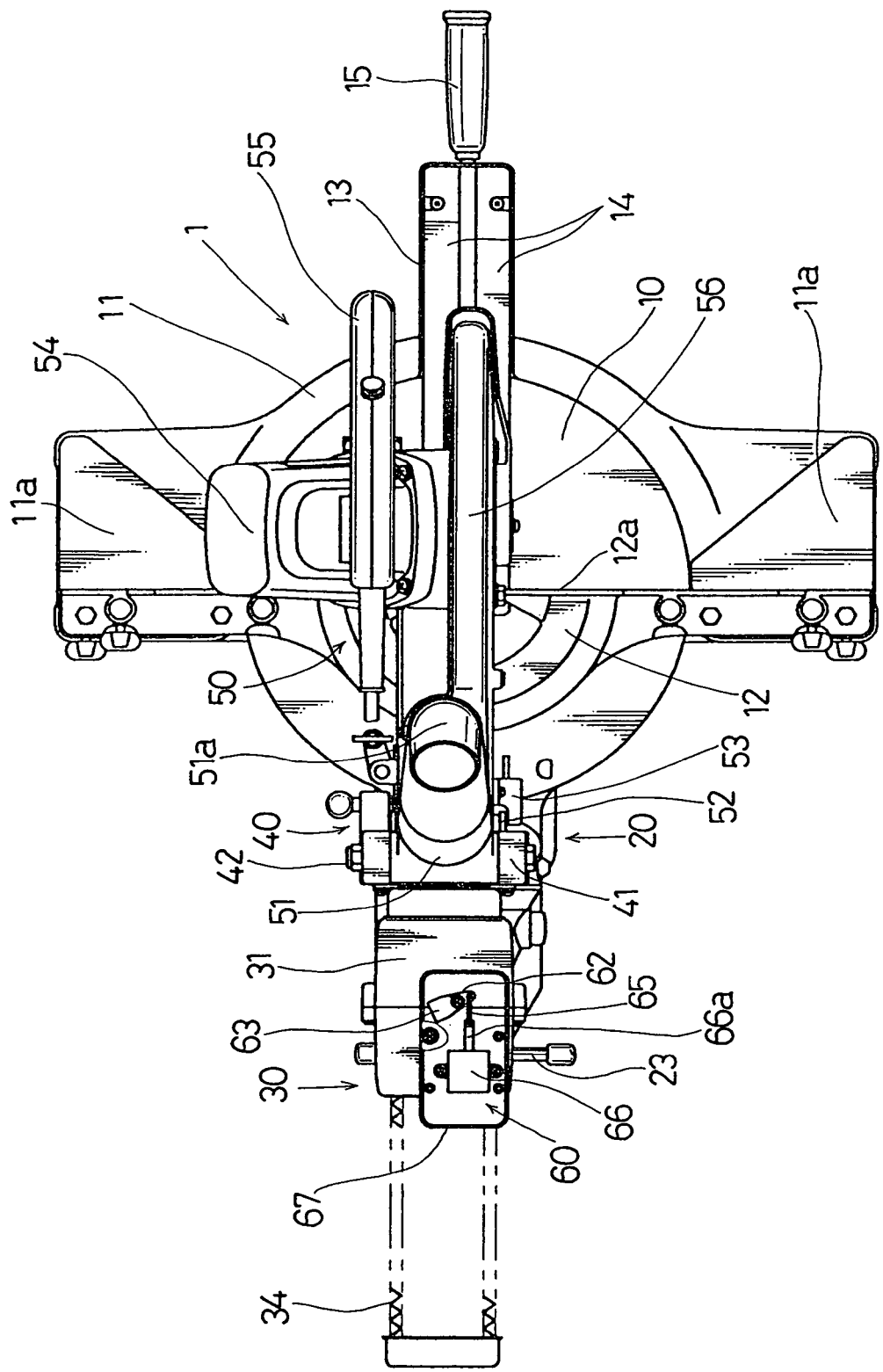
FIG. 2 is a plan view of FIG. 1.

A circular saw 1 is generally shown in FIGS. 1 and 2 and includes a table 10 for placing a workpiece (not shown) thereon. A saw unit 50 is mounted on the table 10 by means of a support device including a lateral pivot mechanism 20, a horizontal slide mechanism 30, and a vertical hinge mechanism 40. The lateral pivot mechanism 20 is disposed at the rear portion (left side portion as viewed in FIG. 1) of the table 10. The slide mechanism 30 is disposed above the lateral pivot mechanism 20. The saw unit 50 is mounted on the front side (right side as viewed in FIG. 1) of the slide mechanism 30 by means of the vertical hinge mechanism 40.

The construction of the table 10 and the lateral pivot mechanism 20 will now be briefly described. The table 10 is rotatably mounted on a base 11. The base 11 includes a pair of auxiliary tables 11a disposed on both lateral sides of the table 10 and extending outwardly therefrom. The auxiliary tables 11a each have upper surfaces, which surfaces extend to be substantially flush with an upper surface of the table 10, on which the workpiece to be cut is placed. A fence 12 extends between the auxiliary tables 11a across the table 10 and serves to determine the position of the workpiece placed on the table 10. Thus, the fence 12 has an abutting surface 12a to abut the workpiece.

The table 10 has an extension 13 that extends forwardly (rightwardly as viewed in FIG. 1) from the table 10. A pair of plates 14 are mounted on the extension 13 and provide a slot between each other for permitting insertion therebetween of a saw blade B mounted on the saw unit 50. The plates 14 have upper surfaces that are substantially flush with the upper surface of the table 10. A hand grip 15 extends forwardly from the front end of the extension 13, so that the operator can turn the table 10 while grasping the hand grip 15.

The lateral pivot mechanism 20 is provided for performing a bevel cutting operation with the saw unit 50 or the saw blade B inclined rightward or leftward relative to the workpiece. The lateral pivot mechanism 20 includes a stationary member 21 secured to the table 10, and a pivotal member 22 pivotable in right and left directions about an axis within a horizontal plane or a plane parallel to the upper surface of the table 10. The lateral pivotal position of the pivotal member 22 can be fixed by tightening a fixing screw 23.

The pivotal member 22 has a support arm 22a extending upwardly from the stationary member 21. A cylindrical holder 31 is provided on the upper end of the support arm 22a and comprises the slide mechanism 30 described above.

A pair of cylindrical holder elements 32 are fixedly received within the holder 31. A slide shaft or a spline shaft 33 extends through the holder elements 32 and engages therewith such that the spline shaft 33 is axially slidably movable but is not rotatable relative to the holder elements 32. A slide lock mechanism 60 is provided on the holder 31 for preventing the spline shaft 33 from moving in the axial direction relative to the holder 31 or for preventing B the saw unit 50 from moving in the horizontal direction relative to the table 10.

The slide lock mechanism 60 is shown in detail in FIGS. 3 to 6. A threaded hole 31a is formed in the upper central portion of the holder 31 and extends towards the center of the holder 31. A fixing screw 61 screws into the threaded hole 31a, so that one end of the fixing screw 61 abuts an outer surface of the spline shaft 33 when the fixing screw 61 is tightened. With one end of the screw 61 pressed 25 against the spline shaft 33, the spline shaft 33 is prevented from moving relative to the holder 31. As a result, the saw unit 50 is prevented from moving in the horizontal direction.

Figure 6:
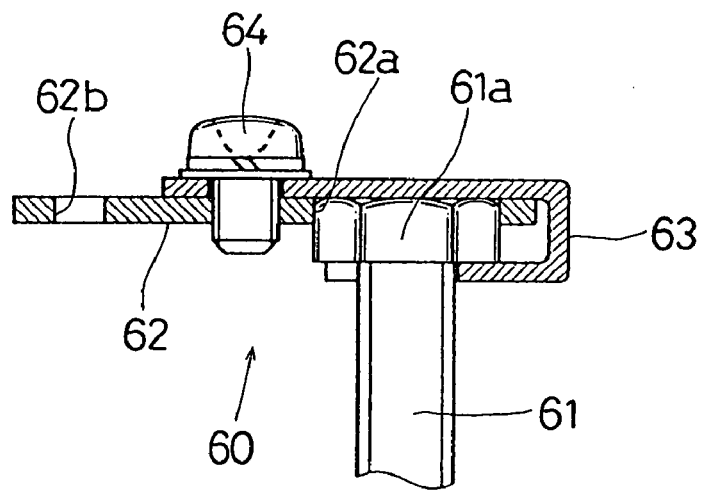
FIG. 6 is a sectional view taken along line VI—VI in FIG. 5.

As shown in FIG. 6, the fixing screw 61 has a head 61a, to which first and second connecting members 62 and 63 are attached. The first connecting member 62 has a connecting opening 62a formed therein. The connecting opening 62a has a hexagonal configuration for closely fitting the head 61a of the fixing screw 61 therein such that fixing screw 61 rotates in unison with the first connecting member 62. As shown in FIG. 6, the second connecting member 63 is folded to have a substantially J-shaped configuration and overlaps the first connecting member 62 such that the folded end extends from one end of the first connecting member 62 and engages the lower surface of the head 61a of the fixing screw 61. The first and second connecting members 62 and 63 are secured to each other by a screw 64. Thus, the second connecting member 63 serves to prevent the first connecting member 62 from being removed from the head 61a of the fixing screw 61.

Figure 5:
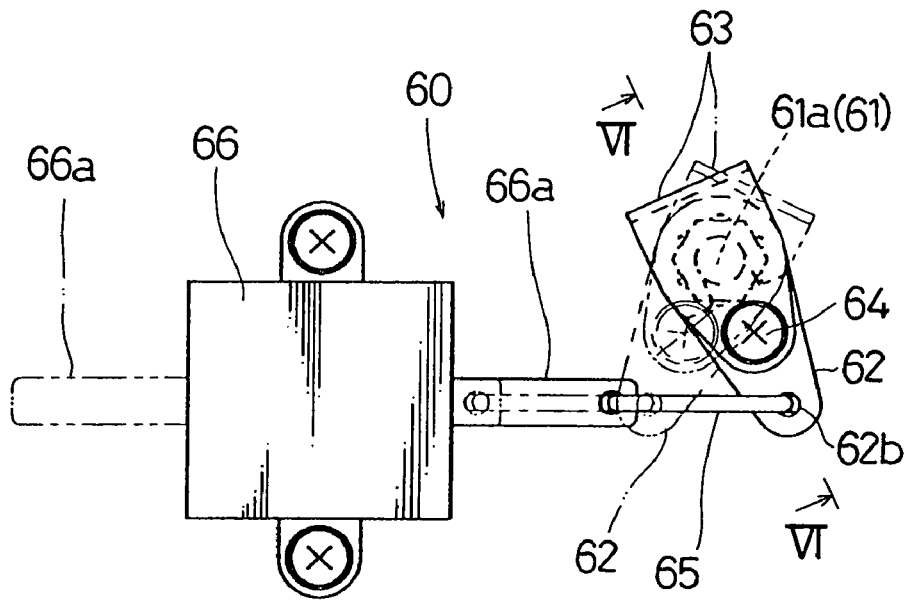
FIG. 5 is an enlarged plan view of a slide lock mechanism.

With this construction, as shown in FIG. 5, when the first connecting member 62 pivots by a predetermined angle, the fixing screw 61 rotates by the same angle, so that the fixing screw 61 is moved axially toward and away from the spline shaft 33. When the fixing screw 61 is moved toward the spline shaft 33 to abut therewith, the spline shaft 33 is prevented from moving in the axial direction, so that the saw unit 50 is prevented from moving in the horizontal direction. On the other hand, when the fixing screw 61 is moved away from the spline shaft 33, the spline shaft 33 is permitted to move in the axial direction, so that the saw unit 50 is permitted to move in the horizontal direction.

Although the head 61a and the connecting opening 62a are hexagonal in this representative embodiment, other configurations may be utilized as long as the configurations of the two parts conform to each other. In addition, the second connecting member 63 and the screw 64 may be omitted by directly joining the first connecting member 62 to the fixing screw 61 by welding, for example.

The first connecting member 62 preferably is pivoted by an actuator 66 that comprises a solenoid (not shown). To achieve this operation, a connecting hole 62b is formed in one end of the first connecting member 62 opposite to the connecting opening 62a. The actuator 66 preferably has a rod 66a joined to an interlock bar 65 that engages the connecting hole 62b. As a result, when the solenoid of the actuator 66 is activated, the rod 66a moves leftward as indicated by dotted lines in FIG. 5. On the other hand, when the solenoid is deactivated, the rod 66a moves rightward as indicated by solid lines in FIG. 5. When the rod 66a moves leftward, the fixing screw 61 rotates in a clockwise direction, so that the fixing screw 61 is moved axially toward the spline shaft 33 so as to abut therewith. When the rod 66a moves rightward, the fixing screw 61 rotates in a counterclockwise direction, so that the fixing screw 61 is loosened and is moved away from the spline shaft 33.

The actuator 66 is activated and deactivated based upon the detection of vertical pivotal movement of the saw unit 50, as will be explained later.

Figure 3:
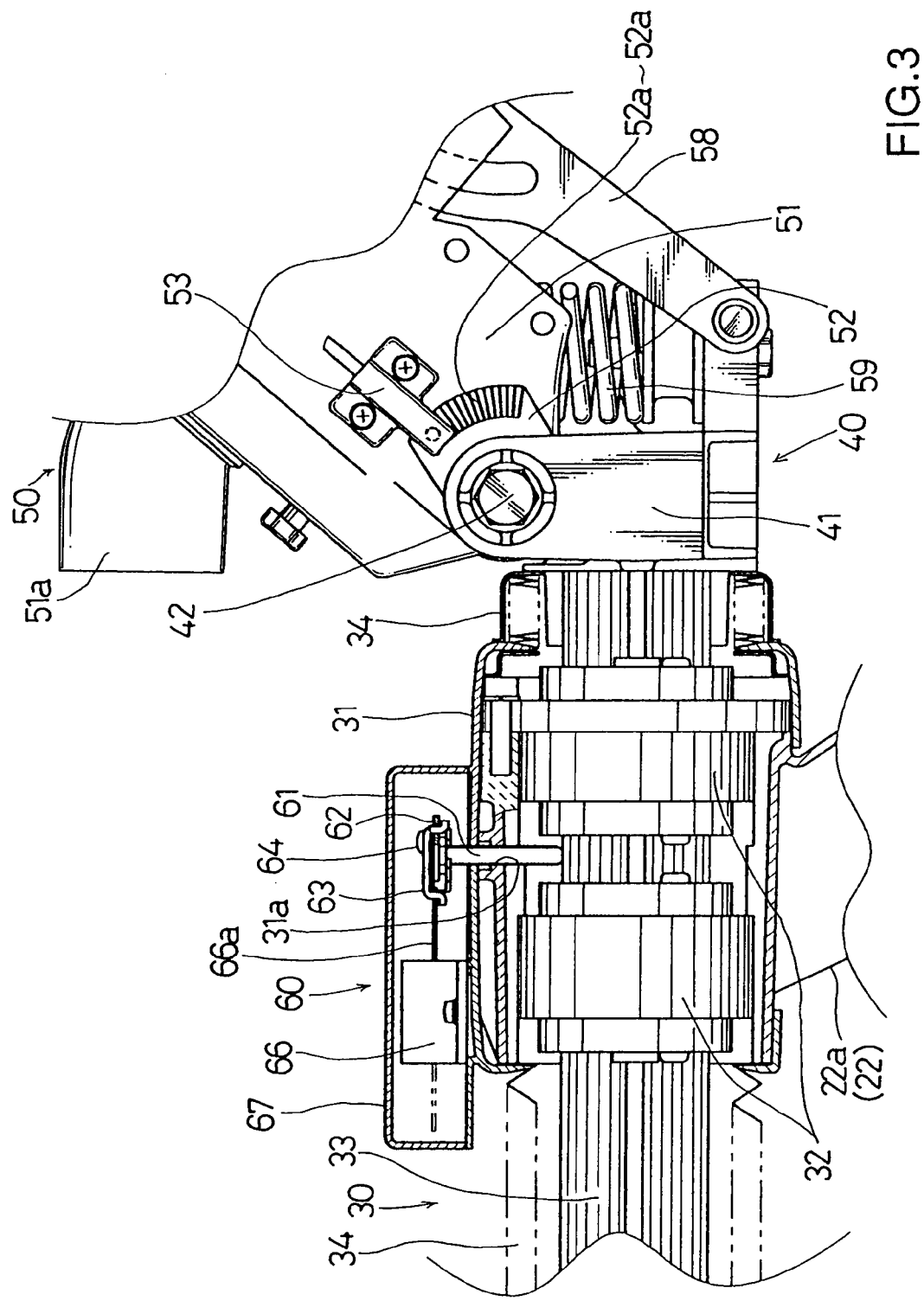
FIG. 3 is an enlarged view of a slide mechanism and a vertical hinge mechanism of the circular saw.
Figure 4:
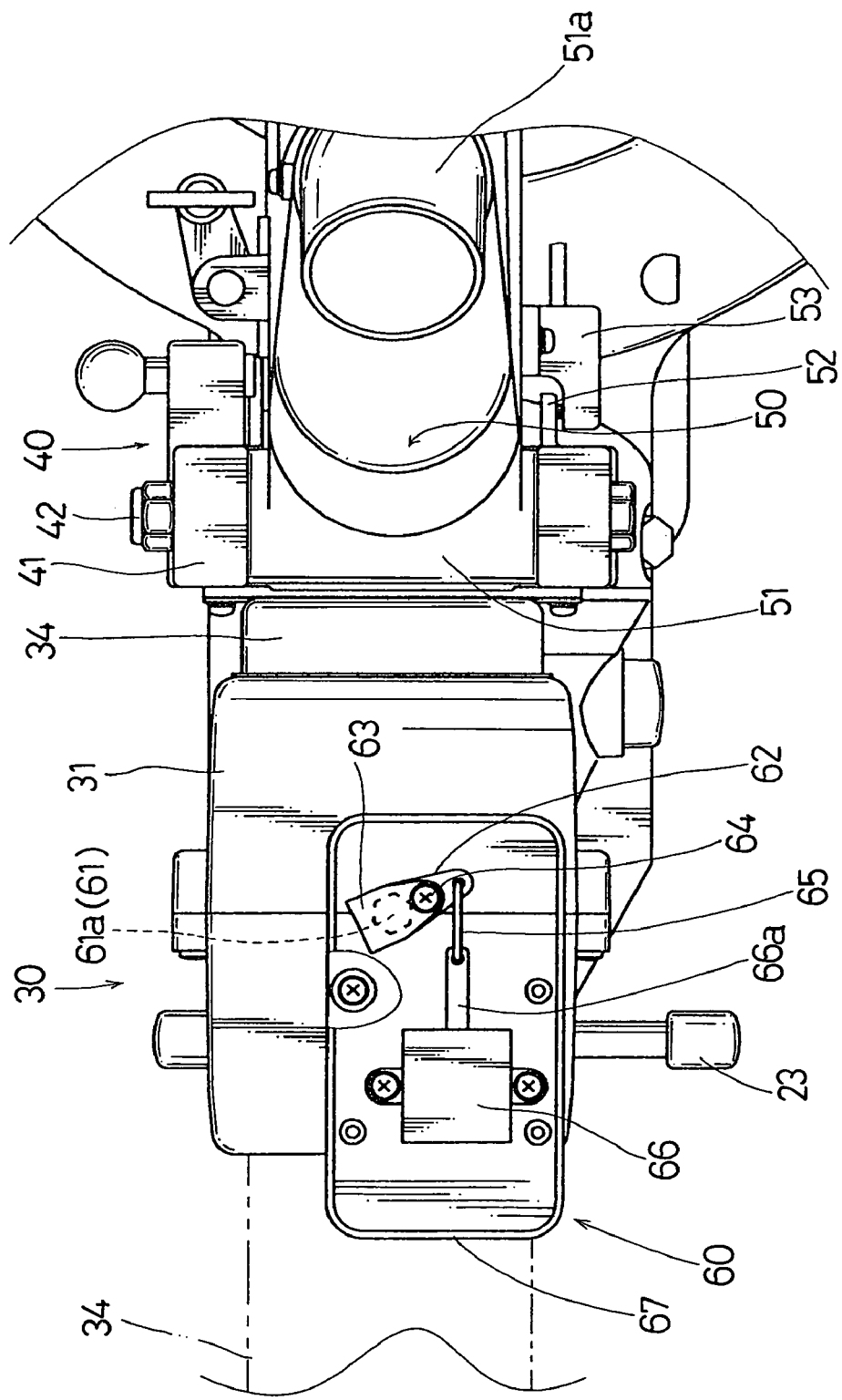
FIG. 4 is a plan view of FIG. 3.

As shown in FIGS. 1, 3 and 4, a dust cover 67 optionally may be formed integrally with the outer surface of the holder 31 so as to substantially enclose the actuator 66 and the first and second connecting members 62 and 63 constituting the slide lock mechanism 60, so that the slide lock mechanism 60 is protected from dust by the dust cover 67.

In addition, as shown in FIGS. 1 and 3, a pair of bellows 34 optionally may be fitted over the spline shaft 33 between the front end (right side as viewed in FIG. 1) of the spline shaft 33 and the front end of the holder 31, and between the rear end (left side as viewed in FIG. 1) of the spline shaft 33 and the rear end of the holder 31, so that the spline 33 is protected from dust by the bellows 34. The saw unit 50 is mounted on the front end of the spline shaft 33 by means of the vertical hinge mechanism 40.

As shown in FIGS. 3 and 4, a pivotal support bracket 41 having a bifurcated configuration preferably is fixed to the front end of the spline shaft 33. The saw unit 50 has a pivotal connecting portion 51 that is pivotally supported between the bifurcated portions of the pivotal support bracket 41 by means of a pin 42, so that the saw unit 50 is vertically pivotable about an axis of the pin 42.

A vertical movement detecting device is provided in this representative embodiment in order to detect when the saw blade B is moving in a vertical direction relative to the table 10. When vertical movement is detected, the actuator 66 is activated and the screw 61 is tightened to abut the spline shaft 33. While a variety of detecting means may be utilized with the present invention, a preferred optical sensor will be particularly described.

According to this representative embodiment, a detector plate 52 is attached to one of the bifurcated portions of the pivotal support bracket 41 and extends obliquely and upwardly along one side surface of the pivotal connecting portion 51. The detector plate 52 has a plurality of parallel identification bars 52a marked on an outer edge thereof. The parallel bars 52a preferably are arranged in series within a predetermined range about the pivotal axis of the saw unit 50. The parallel bars 52a preferably are equally spaced from each other.

A photoelectric sensor 53 is mounted on one side surface of the pivotal connecting portion 51 for detecting the light reflected from the parallel bars 52a. The photoelectric sensor 53 includes a light source and a light detector (not shown). The light source emits light towards the detector plate 52 at a point within an area including the parallel bars 52a, and the light detector senses light reflected by the detector plate 52. As long as the detector plate 52 is held in a fixed position, the light pattern reflected from the parallel bars 52a remains constant. However, when the detector plate 52 is moved as the saw unit 50 is pivoted (at any speed including a uniform speed), the light pattern reflected from the parallel bars 52a as sensed by the light detector will change. The photoelectric sensor 53 therefore detects the vertical pivotal movement of the saw unit 50 as a change in the light pattern of the reflected light.

The photoelectric sensor 53 outputs a control signal to a control unit (not shown) when the change in light pattern is detected. The control unit then supplies power to the solenoid of the actuator 66, so that the solenoid is activated. As a result, the spline shaft 33 or the saw unit 50 is automatically fixed in position in the horizontal direction by the abutment of the screw 61. This fixed state is maintained as long as the saw unit 50 vertically pivots.

When the vertical pivotal movement of the saw unit 50 stops, the light pattern detected by the photoelectric sensor 53 becomes constant again, or a change in the light pattern is no longer detected; therefore, the photoelectric sensor 53 no longer outputs the control signal. As a result, the control unit deactivates the solenoid of the actuator 66 and the fixing screw 61 is automatically loosened to permit movement of the spline shaft 33 in the axial direction or to permit movement of the saw unit 50 in the horizontal direction.

The construction of the saw unit 50 will now be briefly described. As shown in FIGS. 1 and 2, the saw unit 50 includes a motor 54 for rotatably driving the saw blade B, a handle 55 that may be held by the operator, a blade case 56 for substantially covering the upper half of the saw blade B, and a safety cover 57 for substantially covering the lower half of the saw blade B. A link arm 58 is connected between the pivotal support bracket 41 of the vertical hinge mechanism 40 and the safety cover 57, so that the safety cover 57 is movable to cover and uncover the lower half of the saw blade B in response to the pivotal movement of the saw unit 50.

A compression coil spring 59 is provided between the pivotal support bracket 41 of the spline shaft 33 and the pivotal connecting portion 51 of the saw unit 50 for normally maintaining the saw unit 50 in its uppermost vertical position away from the workpiece to be cut. A duct 51a is mounted on the saw unit 50 and is in communication with the interior of the blade case 56, so that cutting chips and dust from the workpiece can be removed from the interior of the blade case 56. The cutting chips discharged from the duct 51a may be collected by a bag (not shown) that is attached to the outlet of the duct 51a.

According to the circular saw 1 of this representative embodiment, when the saw unit 50 is vertically pivoted, such a pivotal movement is detected by the photoelectric sensor 53 as a change in the reflected light pattern. As a result, the photoelectric sensor 53 outputs a control signal to activate the actuator 66 and thereby rotate the fixing screw 61 in the clockwise direction, so that the saw unit 50 as well as the spline shaft 33 are automatically fixed in position in the horizontal direction. Therefore, during the cutting operation performed by lowering the saw unit 50 toward the workpiece, the saw unit 50 is effectively prevented from moving in the horizontal direction and the operator can smoothly and easily perform the cutting operation without being required to hold the workpiece against reaction force of the saw blade B. Also, the operator is not required to manually tighten a fixing screw. Therefore, the operation of the circular saw 1 can be substantially simplified.

A second representative embodiment of the present invention will now be described with reference to FIGS. 7 to 10. A circular saw 100 of the second embodiment is different from the first embodiment mainly in that a pivot lock mechanism 110 is provided in place of the slide lock mechanism 60. The pivot lock mechanism 110 is operable to prevent the saw unit 50 from pivoting in the vertical direction during the movement of the saw unit 50 in the horizontal direction. In all other respects, the construction of the circular saw 100, and in particular, the construction of a table, pivotal support portion and a saw unit, is the same as the circular saw 1 of the first representative embodiment. Therefore, in FIGS. 7 to 10, like parts are given the same reference numerals as in the first representative embodiment, and the description of like features will be omitted.

Figure 7:
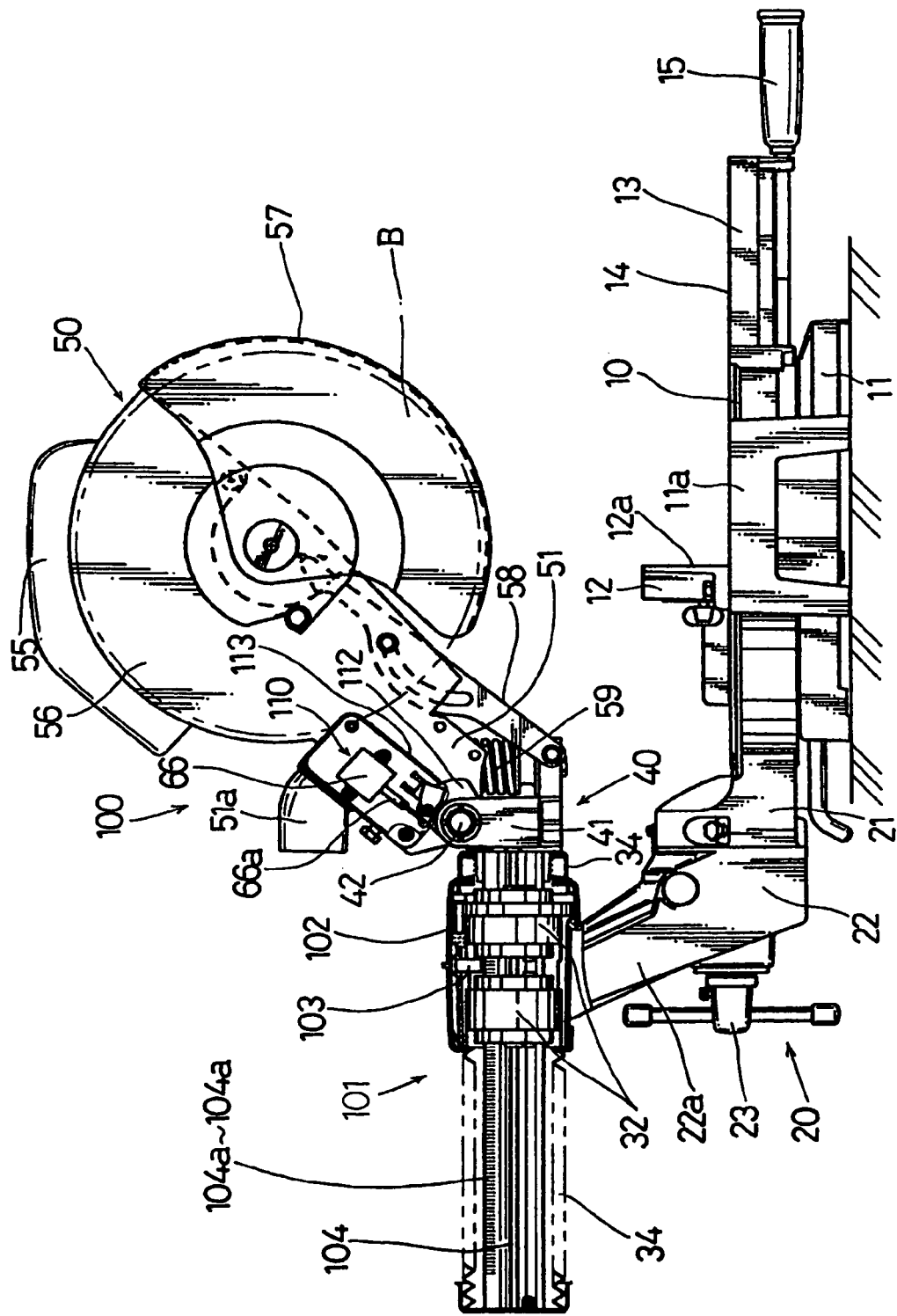
FIG. 7 is a side view of a circular saw according to a second representative embodiment of the present invention.
Figure 8:
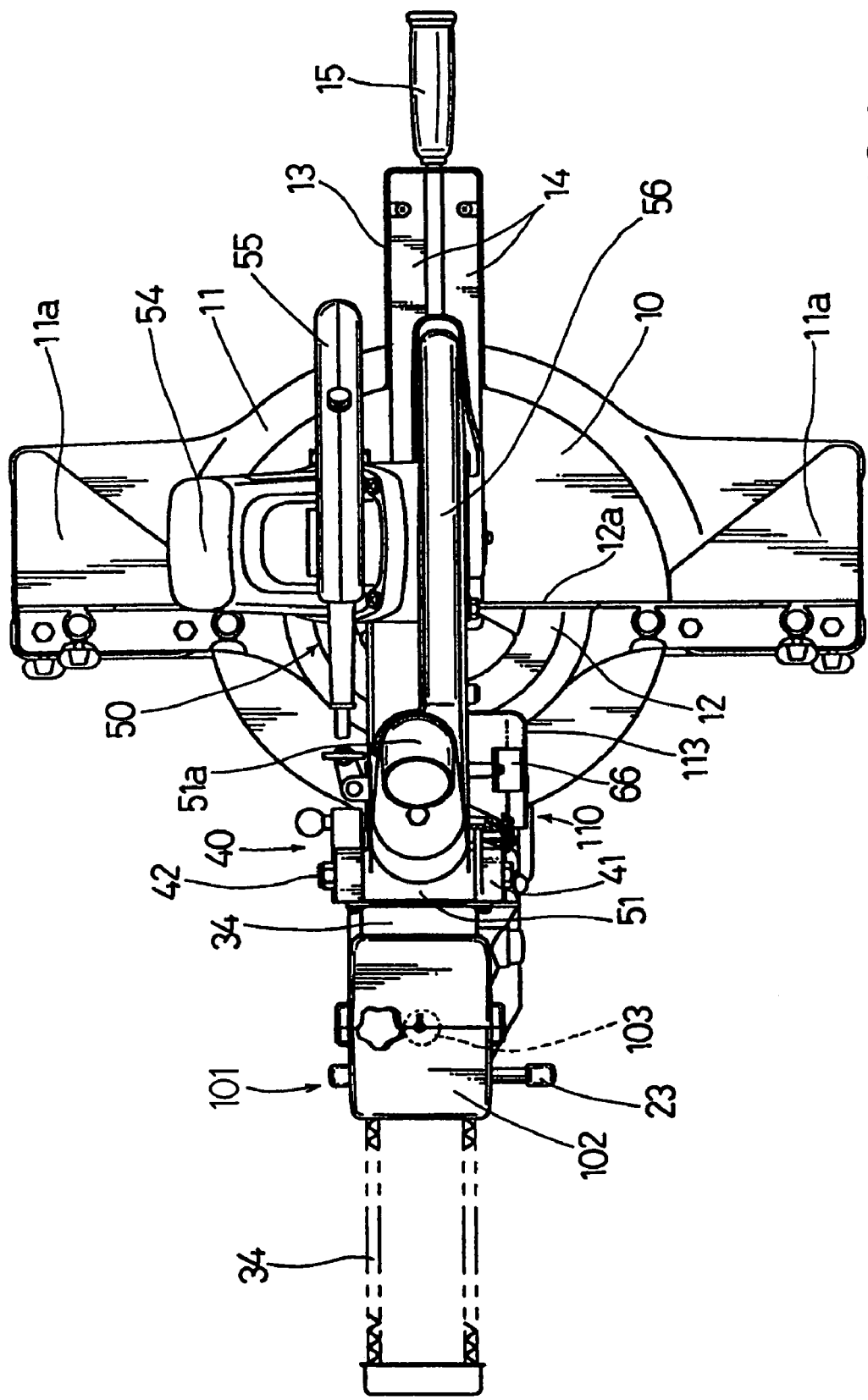
FIG. 8 is a plan view of FIG. 7.
Figure 9:
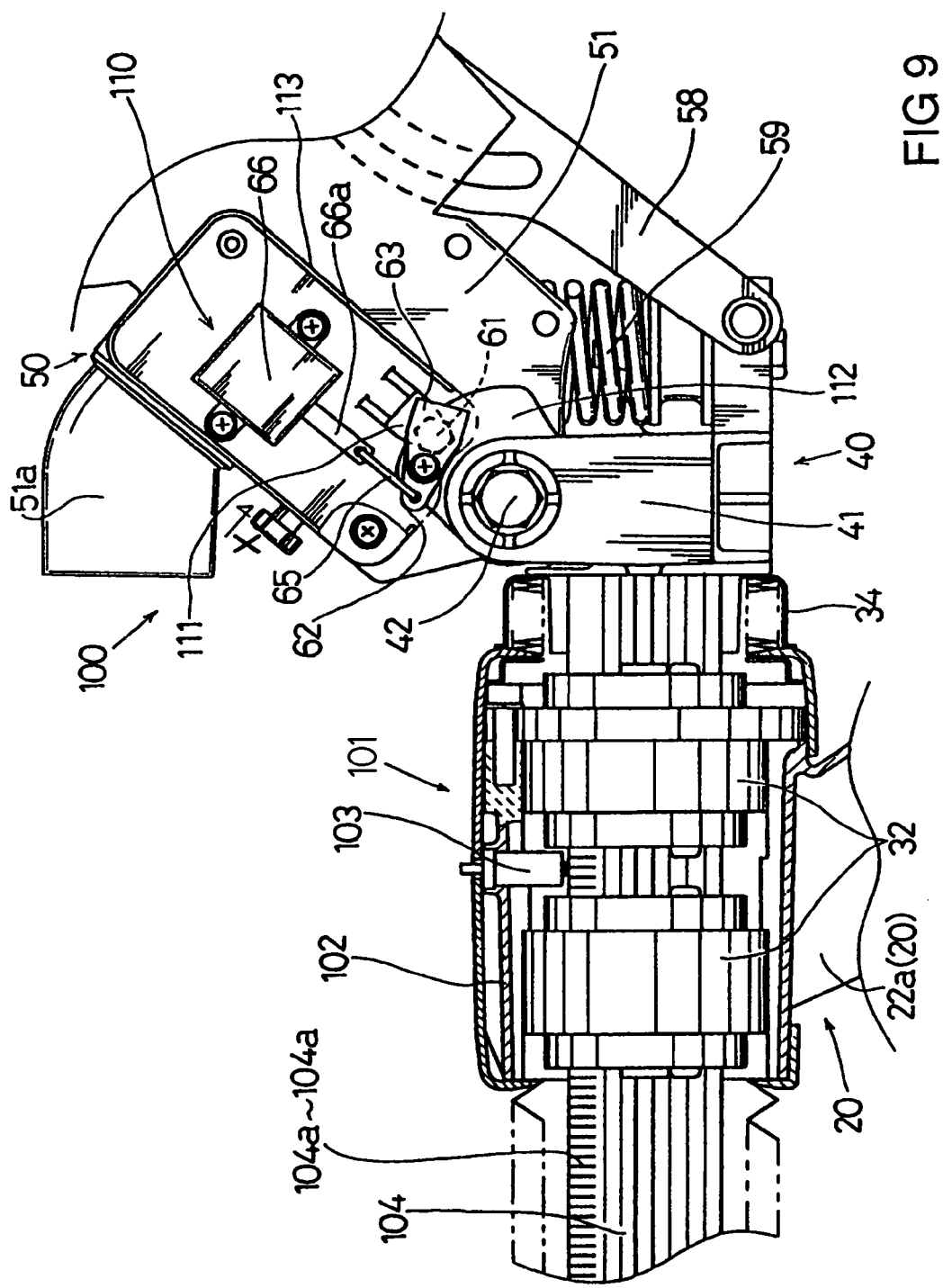
FIG. 9 is an enlarged view of a slide mechanism and a vertical hinge mechanism of the circular saw shown in FIG. 7.

As shown in FIGS. 7 and 9, the circular saw 100 preferably includes a slide mechanism 101 comprising a cylindrical holder 102 and a spline shaft 104. The holder 102 has a pair of cylindrical holder elements 32 for slidably receiving the spline shaft 104. A photoelectric sensor 103 preferably is mounted on the holder 102 of the slide mechanism 101 and includes a light source and a light detector (not shown). The light source emits light downwardly toward the spline shaft 104.

The spline shaft 104 has a plurality of parallel identification bars 104a marked thereon. The parallel bars 104a are equally spaced from each other in the axial direction of the spline shaft 104. The sensor 103 is operable in the same manner as the photoelectric sensor 53 of the first embodiment to detect a change in the light pattern or a change in the amount of light reflected at a point within an area including the parallel bars 104a when the spline shaft 104 is moved in the axial direction. Thus, the photoelectric sensor 103 serves to detect the horizontal movement of the saw unit 50. This function is different from the photoelectric sensor 53 of the first representative embodiment, in which the vertical pivotal movement of the saw unit 50 was detected.

The pivot lock mechanism 110 is disposed on one side of the pivotal support portion 51 of the saw unit 50. The parts of the pivot lock mechanism 110 are substantially the same as those of the slide lock mechanism 60 of the first embodiment. Thus, the pivot lock mechanism 110 preferably includes an actuator 66, an interlock bar 65, first and second connecting members 62 and 63 and a fixing screw 61. In this embodiment, however, the fixing screw 61 is inserted into a threaded hole 111a formed in a protrusion 111 that is integral with the pivotal support portion 51. The protrusion 111 has a substantially inverted L-shaped configuration in cross-section as viewed in FIG. 10.

Figure 10:
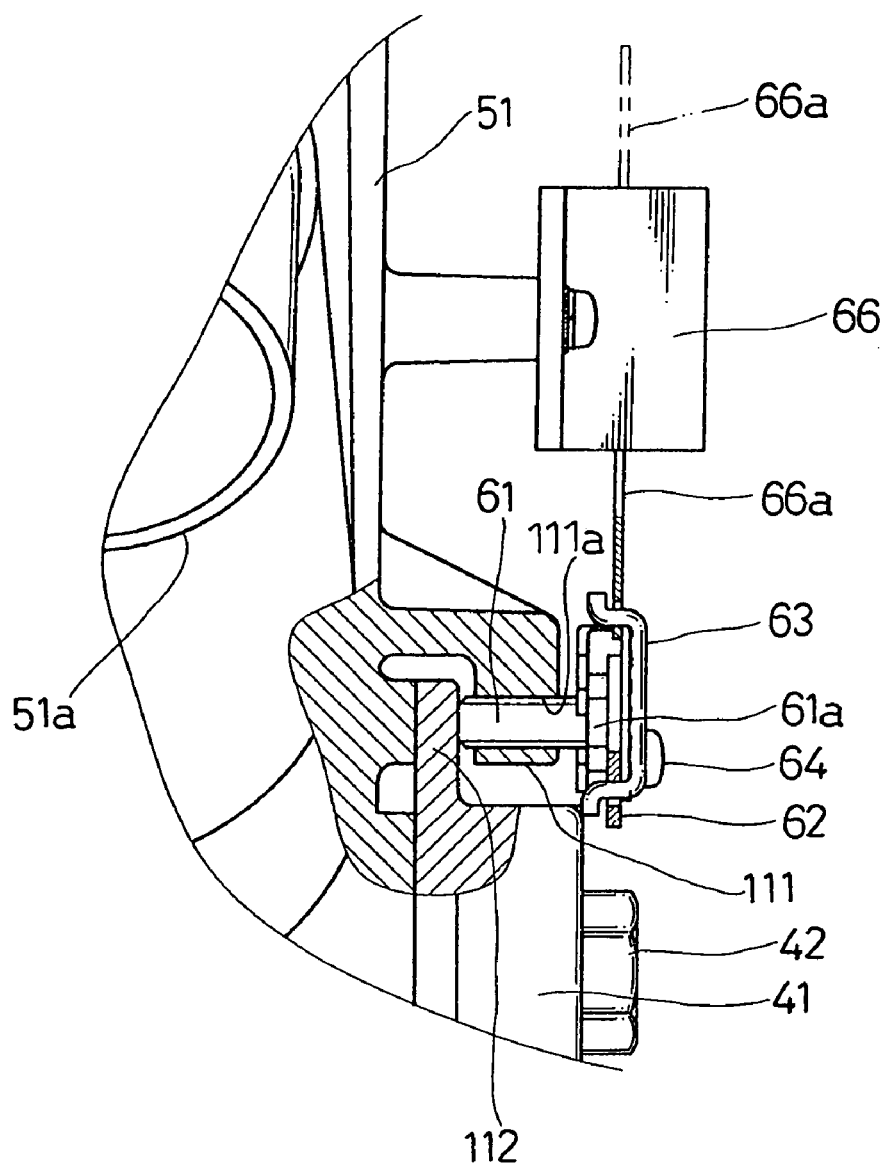
FIG. 10 is an enlarged view of a slide lock mechanism as viewed from a direction indicated by arrow X in FIG. 9.

A flange 112 is formed integrally with the pivotal support bracket 41 and extends into a gap formed between the folded end of the protrusion 111 and the support portion 51, so that one end of the fixing screw 61 opposes the flange 112 as shown in FIG. 10. The flange 112 has a width in a radial direction about the pivotal axis (the pin 42) such that the fixing screw 61 opposes the flange 112 when the saw unit 50 is in any pivotal position. In the same manner as the slide lock mechanism 60 of the first embodiment, the pivot lock mechanism 110 may optionally be protected by a dust cover 113 from the outside environment.

According to the circular saw 100 of this representative embodiment, as the saw unit 50 is moved in the horizontal direction or as the spline shaft 104 is slidably moved in the axial direction, the photoelectric sensor 103 detects the movement of the spline shaft 104. The photoelectric sensor 103 then outputs a control signal to a control unit (not shown) in the same manner as the first representative embodiment. The control unit activates the solenoid of the actuator 66 and the solenoid of the actuator 66 then moves a rod 66a upwardly as viewed in FIG. 8. As a result, the fixing screw 61 is rotated by a predetermined angle and is moved axially toward the flange 112 of the pivotal support bracket 41.

When one end of the fixing screw 61 abuts the flange 112, the saw unit 50 is fixed in position in the vertical direction. This fixed state is maintained as long as the saw unit 50 is moving in the horizontal direction.

When the horizontal movement of the saw unit 50 stops, the photoelectric sensor 103 no longer detects a change in the reflected light pattern, and the control unit deactivates the actuator 66. The rod 66a of the actuator 66 then extends downwardly as shown in FIG. 9, so that the fixing screw 61 is rotated to be loosened. As a result, one end of the fixing screw 61 is moved away from the flange 112, and the saw unit 50 is permitted to pivot vertically.

As described above, with the circular saw 100 of the second representative embodiment, the saw unit 50 is prevented from pivoting in the vertical direction during the movement of the saw unit 50 in the horizontal direction. Therefore, the operator is not required to hold the vertical position (pivoted position) of the saw unit 50 during the cutting operation while pushing the saw unit 50 in the horizontal direction. For this reason, the operator can concentrate on the pushing operation, and the cutting operation can be smoothly and easily performed.

As described above, the circular saw 1 of the first representative embodiment has the function of preventing to the saw unit 50 from moving in the horizontal direction during the vertical pivotal movement of the saw unit 50, while the circular saw 100 of the second representative embodiment has the function of preventing the saw unit 50 from pivoting in the vertical direction during the horizontal movement of the saw unit 50. However, both these two functions may be provided in the same circular saw.

In addition, although the above representative embodiments have been described in connection with a portable circular saw, in which a saw unit is vertically pivotable about a pivotal axis, the present invention may also be utilized with a circular saw having a saw unit that is vertically movable in parallel to a table, or a table saw that has a table for fixed installation to the workplace.

Further, the photoelectric sensors 53, 103 may be replaced by any other non-contact sensors, such as magnetic sensors, or contact sensors. For example, in order to detect the pivotal movement of the saw unit 50, a potentiometer may be mounted on the blade case 56 adjacent the pivotal axis of the saw unit 50. Further, in order to detect the horizontal movement of the saw unit 50, a roller and a potentiometer may be mounted on the holder 31 (102). The roller can slidably contact the spline shaft 33 (104) such that it rotates as the spline shaft is moved. The potentiometer detects the rotation of the roller, so that the potentiometer serves as a sensor for detecting the horizontal movement of the saw unit 50.

While the invention has been described with reference to preferred embodiments thereof, it is to be understood that modifications or variations may be easily made without departing from the spirit of this invention which is defined by the appended claims.

What is claimed is:

1. A circular saw comprising:
   a table having an upper surface for placing a workpiece thereon;
   a saw unit having a saw blade mounted thereon;
   means for supporting said saw unit on said table, said supporting means enabling said saw unit to move in a horizontal direction parallel to said upper surface of said table and to move in a vertical direction relative to said upper surface of said table; and
   at least one of first lock means and second lock means, wherein said first lock means automatically prevents said saw unit from moving in the horizontal direction upon detection of movement of said saw unit in the vertical direction by a first sensing means, and the second lock means automatically prevents said saw unit from moving in the vertical direction upon detection of movement of said saw unit in the horizontal direction by a second sensing means.

2. The circular saw as defined in claim 1 wherein the circular saw includes the first lock means and said first lock means comprises a fixing member releasably fixing said saw unit in position relative to said table in the horizontal direction and an actuator coupled to and selectively operating said fixing member.

3. The circular saw as defined in claim 2 wherein:
   said support means includes a support arm mounted on said table, a slide member horizontally slidable relative to said support arm, and hinge means for vertically pivotally connecting said saw unit to said slide member; and
   wherein said fixing member releasably fixes said slide member in position relative to said support arm when said first sensing means detects said vertical pivotal movement of said saw unit relative to said slide member.

4. The circular saw as defined in claim 3 wherein:
   said slide member comprises a slide shaft slidably inserted into a shaft holder provided on said support arm;
   said fixing member comprises a screw inserted into a threaded hole formed in said shaft holder in a direction perpendicular to a longitudinal axis of said slide shaft, said screw having one end arranged and constructed to abut said slide shaft; and
   wherein said actuator rotates said screw in both clockwise and counterclockwise directions so as to move said screw toward and away from said slide shaft.

5. The circular saw as defined in claim 4 further including a dust cover mounted on said holder and covering said actuator and said screw, thereby protecting said actuator and said screw from the outside environment.

6. The circular saw as defined in claim 4 wherein:
   said first sensing means comprises a detector plate mounted on one of said slide shaft or said saw unit, and an optical sensor mounted on the other of said slide shaft and said saw unit;
   said detector plate having a plurality of parallel identification bars marked thereon, and said parallel bars being spaced from each other by a predetermined distance; and
   wherein said optical sensor detects movement of said parallel identification bars as a change in a reflected light pattern.

7. The circular saw as defined in claim 1 wherein the circular saw includes the second lock means and said second lock means comprises a fixing member releasably fixing said saw unit in position relative to said table in the vertical direction and an actuator coupled to and selectively operating said fixing member.

8. The circular saw as defined in claim 7 wherein:
   said support means includes a support arm mounted on said table, a slide member horizontally slidable relative to said support arm, and hinge means for vertically pivotally connecting said saw unit to said slide member; and
   wherein said fixing member releasably fixes the pivotal position of said saw unit relative to said slide member when said second sensing means detects horizontal sliding movement of said slide member relative to said support arm.

9. The circular saw as defined in claim 8 wherein:
   said slide member comprises a slide shaft slidably inserted into a shaft holder provided on said support arm;
   said fixing member comprises a screw engaged with a threaded hole formed in said saw unit in a direction parallel to the pivotal axis of said saw unit;
   said slide shaft having a flange portion that includes an abutting surface extending within a plane perpendicular to the pivotal axis of said saw unit and one end of said screw is arranged and constructed to abut said abutting surface of said flange portion; and
   wherein said actuator rotates said screw in both clockwise and counterclockwise directions so as to move said screw toward and away from said abutting surface.

10. The circular saw as defined in claim 9 further including a dust cover mounted on said saw unit and covering said actuator and said screw, thereby protecting said actuator and said screw from the outside environment.

11. The circular saw as defined in claim 9 wherein:
    said second sensing means includes a plurality of parallel identification bars marked on said slide shaft and an optical sensor provided on said shaft holder;
    said parallel bars being spaced from each other by a predetermined distance along a longitudinal axis of said slide shaft; and wherein said optical sensor detects movement of said parallel identification bars as a change in a reflected light pattern.

12. The circular saw as defined in claim 1 wherein the circular saw includes both said first lock means and said second lock means.

13. The circular saw as defined in claim 12 wherein:
said first lock means includes a first fixing member releasably fixing said saw unit in position relative to said table in the horizontal direction and a first actuator coupled to the first fixing member, said first actuator selectively moving said first fixing member between a locked position and an unlocked position; and
said second lock means includes a second fixing member releasably fixing said saw unit in position relative to said table in the vertical direction and a second actuator coupled to the second fixing member, said second actuator selectively moving said second fixing member between a locked position and an unlocked position.

14. The circular saw as defined in claim 13 wherein:
said support means includes a support arm mounted on said table and a slide shaft coupled to the support arm, wherein the slide shaft is slidable horizontally relative to said support arm, and a hinge means coupling the slide shaft to the saw unit, wherein said saw unit can pivot vertically relative to said slide shaft;
wherein said first fixing member fixes said slide shaft in position relative to said support arm when said first sensing means detects vertical pivotal movement of said saw unit relative to said slide shaft; and
wherein said second fixing member fixes the pivotal position of said saw unit relative to said slide shaft when said second sensor means detects horizontal movement of said saw unit relative to said support arm.

15. The circular saw as defined in claim 14 wherein:
said slide shaft is slidably received in a shaft holder provided on said support arm;
said first fixing member comprises a first screw inserted into a first threaded hole formed in said shaft holder in a direction perpendicular to a longitudinal axis of said slide shaft, one end of said first screw being arranged and constructed to abut said slide shaft;
wherein said first actuator rotates said first screw in both clockwise and counterclockwise directions so as to move said first screw toward and away from said slide shaft;
said second fixing member comprises a second screw inserted into a second threaded hole formed in said saw unit in a direction parallel to the pivotal axis of said saw unit;
and wherein the circular saw further comprises a flange portion having an abutting surface extending within a plane perpendicular to the pivotal axis of said saw unit, one end of said second screw being arranged and constructed to abut said abutting surface of said flange portion; and
wherein said second actuator rotates said second screw in both clockwise and counterclockwise directions so as to move said second screw toward and away from said abutting surface.

16. The circular saw as defined in claim 15 further including a first dust cover and a second dust cover, said first dust cover being mounted on said holder and covering said first actuator and said first screw, thereby protecting said first actuator and said first screw from the outside environment, and said second dust cover being mounted on said saw unit and covering said second actuator and said second screw, thereby protecting said second actuator and said second screw from the outside environment.

17. The circular saw as defined in claim 15 wherein:
said first sensing means comprises a detector plate mounted on one of said slide shaft or said saw unit, and a first optical sensor mounted on the other of said slide shaft and said saw unit;
said detector plate having a plurality of first parallel identification bars marked thereon, said first parallel identification bars being spaced from each other by a predetermined distance;
wherein said first optical sensor detects movement of said first parallel identification bars as a change in a reflected light pattern;
said second sensing means comprises a plurality of second parallel identification bars marked on said slide shaft and a second optical sensor provided on said shaft holder;
said second parallel identification bars being spaced from each other by a predetermined distance along the longitudinal axis of said slide shaft; and
wherein said second optical sensor detects movement of said second parallel identification bars as a change in a reflected light pattern.

18. An apparatus comprising:
a table,
a saw unit coupled to the table and comprising a saw blade that is movable at least in a horizontal direction relative to the table and a vertical direction relative to the tables and
at least one lock coupled to and disposed between the saw unit and the table, the at least one lock selected from the group consisting of a first lock and a second lock, wherein:
the first lock is operationally coupled to a first sensor, wherein the first lock automatically prevents the saw blade from moving in the horizontal direction relative to the table when the first sensor detects the saw blade moving in the vertical directions and automatically permits the saw blade to move in the horizontal direction after the first sensor detects the saw blade has stopped moving in the vertical direction, and
the second lock is operationally coupled to a second sensor, wherein the second lock automatically prevents the saw blade from moving in the vertical direction relative to the table when the second sensor detects the saw blade moving in the horizontal direction, and automatically permits the saw blade to move in the vertical direction after the second sensor detects the saw blade has stopped moving in the horizontal direction.

19. An apparatus as in claim 18 wherein the apparatus comprises both said first lock and said second lock.

20. An apparatus as in claim 19, wherein:
the first lock comprises a first actuator coupled to the first sensor, and
the second lock comprises a second actuator coupled to the second sensor, wherein the first and second actuators convert electric signals generated by the sensors into mechanical energy to actuate the first and second locks, respectively.

21. An apparatus as in claim 20, further comprising:
a support arm mounted on the table,
a slide shaft coupled to the support arm, wherein the slide shaft is slidable horizontally relative to the support arm, and a vertically pivotable hinge coupling the saw unit to the slide shaft, wherein:
when the first sensor detects vertical pivotal movement of the saw blade relative to the slide shaft, the first lock fixes the slide shaft in a position relative to the support arm, and
when the second sensor detects horizontal movement of the saw blade relative to the support arm, the second lock fixes the saw blade in a position relative to the slide shaft.

22. An apparatus as in claim 21 wherein:
the slide shaft is slidably received in a shaft holder connected to the support arm,
the first lock comprises a first screw inserted into a first threaded hole formed in the shaft holder in a direction perpendicular to a longitudinal axis of the slide shaft, one end of the first screw being arranged and constructed to abut the slide shaft, wherein the first screw is coupled to the first actuator and the first screw is rotatable in both clockwise and counterclockwise directions so as to move the first screw toward and away from the slide shaft,
the second lock comprises a second screw inserted into a second threaded hole formed in the saw unit in a direction parallel to the vertical pivotal axis of the saw blade, and
wherein the apparatus further comprises a flange portion having an abutting surface extending within a plane perpendicular to the vertical pivotal axis of the saw blade, one end of the second screw being arranged and constructed to abut the abutting surface of the flange portion, wherein the second screw is coupled to the second actuator and the second screw is rotatable in both clockwise and counterclockwise directions so as to move the second screw toward and away from the abutting surface.

23. An apparatus as in claim 22 further comprising:
a first dust cover covering and protecting the first actuator and the first screw from the outside environment, and
a second dust cover covering and protecting the second actuator and the second screw from the outside environment.

24. An apparatus as in claim 23 wherein:
the first sensor includes a first detector plate mounted on either the slide shaft or the support arm, and wherein the first sensor further includes a first optical sensor mounted on the other of the slide shaft and the support arm, the first detector plate having a plurality of first parallel identification bars that are spaced from each other by predetermined distances, and the first optical sensor is disposed in relation to the first detector plate such that the first optical sensor detects movement of the first parallel identification bars as a change in a reflected light pattern; and wherein
the second sensor includes a plurality of second parallel identification bars marked on the slide shaft, wherein the second sensor includes a second optical sensor coupled to the shaft holder, the second parallel identification bars are spaced from each other by predetermined distances in the longitudinal axis of the slide shaft and the second optical sensor is disposed in relation to the second parallel identification bars such that the second optical sensor detects movement of the second parallel identification bars as a change in a reflected light pattern.

25. An apparatus comprising:
a table having a surface for placing a workpiece thereon,
a saw unit having a saw blade,
a first means for enabling the saw unit to move in a horizontal plane that is parallel to the surface of the table, the first means being coupled to the table and the saw unit,
a second means for enabling the saw unit to move in a vertical plane relative to the surface of the table, the second means being coupled to the table and the saw unit,
a first sensor detecting movement of the saw unit in the vertical plane,
a first lock operably coupled to the first means and the first sensor, wherein the first lock automatically prevents horizontal movement of the saw unit upon detection by the first sensor of the saw unit pivotally moving in the vertical plane,
a second sensor detecting movement of the saw unit in the horizontal plane, and
a second lock operably coupled to the second means and the second sensor, wherein the second lock automatically prevents vertical pivotal movement of the saw unit upon detection by the second sensor of the saw unit moving in the horizontal plane.

26. An apparatus as in claim 25, wherein the first lock comprises a first screw, wherein the first screw releasably fixes the saw unit in position relative to the table in the horizontal plane when the first screw engages the first means.

27. An apparatus as in claim 26,
wherein the first lock comprises a first actuator coupled to the first sensor and the first screw, wherein the first actuator rotates the first screw in response to detection by the first sensor of pivotal movement of the saw unit in the vertical plane.

28. An apparatus as in claim 27, wherein the second lock comprises a second screw, wherein the second screw releasably fixes the saw unit in position relative to the table in the vertical plane when the second screw engages the second means.

29. An apparatus comprising:
a table;
a saw coupled to the table, the saw being movable at least in a horizontal direction relative to the table and a vertical direction relative to the table;
a sensor coupled to the saw or the table and disposed in a position to detect movement of the saw in the vertical direction relative to the table, and
a lock operably coupled to the sensor, wherein the lock automatically prevents horizontal movement of the saw upon detection by the sensor of the saw moving in the vertical direction relative to the table.

30. An apparatus comprising:
a table;
a saw coupled to the table, the saw being movable at least in a horizontal direction relative to the table and a vertical direction relative to the table;
a sensor coupled to the saw or the table and disposed in a position to detect movement of the saw in the horizontal direction relative to the table; and
a lock operably coupled to the sensor, wherein the lock automatically prevents vertical movement of the saw upon detection by the sensor of the saw moving in the horizontal direction relative to the table.

31. An apparatus comprising:
   means for supporting a workpiece,
   means for cutting the workpiece,
   means for enabling the cutting means to move in a plane that is parallel to the workpiece supporting means,
   means for enabling the cutting means to move towards and away from the workpiece supporting means,
   first sensing means for sensing movement of the cutting means towards the workpiece supporting means, and
   first means for automatically preventing the cutting means from moving in the plane parallel to the workpiece supporting means upon detection by the first sensing means of the cutting means moving towards the workpiece supporting means, wherein the first means for automatically preventing the cutting means from moving in the plane parallel to the workpiece supporting means is in communication with the first sensing means.

32. An apparatus as in claim 31, further comprising:
   second sensing means for sensing movement of the cutting means in the plane parallel to the workpiece supporting means, and
   second means for automatically preventing the cutting means from moving towards the workpiece supporting means upon detection by the second sensing means of the cutting means moving in the plane parallel to the workpiece supporting means, wherein the second means for automatically preventing the cutting means from moving towards the workpiece supporting means is in communication with the second sensing means.

33. An apparatus as in claim 31, further comprising means for enabling the cutting means to laterally pivot relative to the workpiece supporting means so as to permit bevel cutting operations.

34. An apparatus comprising:
   means for supporting a workpiece,
   means for cutting the workpiece,
   means for enabling the cutting means to move in a plane that is parallel to the workpiece supporting means,
   means for enabling the cutting means to move towards and away from the workpiece supporting means,
   means for sensing movement of the cutting means in the plane parallel to the workpiece supporting means, and
   means for automatically preventing the cutting means from moving towards the workpiece supporting means upon detection by the sensing means of the cutting means moving in the plane parallel to the workpiece supporting means, wherein the means for automatically preventing the cutting means from moving towards the workpiece supporting means is in communication with the means for sensing movement of the cutting means in the plane parallel to the workpiece supporting means.

35. An apparatus as in claim 34, further comprising means for permitting the cutting means to laterally pivot relative to the workpiece supporting means so as to permit bevel cutting operations.

36. An apparatus comprising:
   a table having a surface for supporting a workpiece,
   a saw coupled to the table, the saw being movable at least in a direction parallel to the table surface and being movable towards and away from the table surface,
   a sensor detecting pivotal movement of the saw towards the table surface, and
   a lock operably communicating with the sensor, wherein the lock is arranged and constructed to automatically prevent movement of the saw parallel to the table surface upon detection by the sensor of the saw pivotally moving towards the table surface.

37. An apparatus as in claim 36, further comprising:
   a support arm coupled to the table,
   a shaft holder connected to the support arm,
   a shaft slidably received within the shaft holders and
   a hinge coupling the shaft holder to the saw, the hinge permitting movement of the saw towards and away from the table surface.

38. An apparatus as in claim 37, wherein the lock further comprises a screw threadably engaged within the shaft holder and a solenoid in communication with the sensor and coupled to the screw, wherein the solenoid rotates the screw to engage the shaft upon detection by the sensor of the saw moving towards the table surface, whereby movement of the saw parallel to the table surface is prevented.

39. An apparatus as in claim 38, further comprising a lateral pivot mechanism coupled to the support arm, the lateral pivot mechanism enabling the saw to be inclined relative to the table surface for bevel cutting operations.

40. An apparatus comprising:
   a table having a surface for supporting a workpiece,
   a saw coupled to the table, the saw being movable at least in a direction parallel to the table surface and being movable towards and away from the table surface,
   a sensor detecting movement of the saw parallel to the table surfaces and
   a lock operably communicating with the sensor, wherein the lock is arranged and constructed to automatically prevent movement of the saw towards the table surface upon detection by the sensor of the saw moving parallel to the table surface.

41. An apparatus as in claim 40, further comprising:
   a support arm coupled to the table,
   a shaft holder connected to the support arm,
   a shaft slidably received within the shaft holder, and
   a hinge coupling the shaft holder to the saw, the hinge permitting vertical pivotal movement of the saw towards and away from the table surface.

42. An apparatus as in claim 41, further comprising a screw arranged and constructed to the hinge and a solenoid in communication with the sensor and coupled to the screw, wherein the solenoid rotates the screw to engage the hinge upon detection by the sensor of the saw moving parallel to the table surface, whereby movement of the saw towards the table surface is prevented.

43. An apparatus as in claim 42, further comprising a lateral pivot mechanism coupled to the support arm, the lateral pivot mechanism enabling the saw to be inclined relative to the table surface for bevel cutting operations.

44. An apparatus comprising:
   a table having a surface arranged and constructed to support a workpiece,
   a saw unit having a saw blade,
   a support arm coupled to the table,
   a shaft holder connected to the support arm,
   a shaft slidably received within the shaft holder, the shaft permitting the saw unit to move parallel to the table surface,
   a hinge coupling the shaft to the saw unit, the hinge permitting the saw unit to move towards and away from the table surface,
   a first sensor detecting movement of the saw unit parallel to the table surface,
   a second sensor detecting movement of the saw unit towards the table surface, a first lock communicating with the first sensor, wherein the first lock is arranged and constructed to automatically prevent movement of the saw unit towards the table surface without operator assistance upon detection by the first sensor of the saw unit moving parallel to the table surface, and a second lock communicating with the second sensor, wherein the second lock is arranged and constructed to automatically prevent movement of the saw unit parallel to the table surface without operator assistance upon detection by the second sensor of the saw unit moving towards the table surface.

45. An apparatus as in claim 44, wherein the second lock further comprises a screw threadably engaged within the shaft holder, and a solenoid in communication with the second sensor and coupled to the screw, wherein the solenoid rotates the screw to engage the shaft upon detection by the second sensor of the saw unit moving towards the table surface, whereby movement of the saw unit parallel to the table surface is prevented.

46. An apparatus as in claim 45, further comprising a lateral pivot mechanism coupled to the support arm, the lateral pivot mechanism enabling the saw unit to be inclined relative to the table surface for bevel cutting operations.

47. An apparatus for cutting a workpiece comprising:

means for supporting a saw unit, said supporting means enabling said saw unit to move in a plane parallel to a surface of a table, wherein the saw unit comprises a saw blade and wherein the table is pivotally coupled to the saw unit, means for detecting movement of the saw blade in a plane parallel to the table surface, the detecting means being disposed proximally to the saw unit, means for releasably locking said saw unit so as to only allow the movement in a plane parallel to the table surface, and wherein the detecting means is connected to the releasable locking means, and wherein the releasable locking means prevents a movement of the saw unit in a plane intersecting the table surface.

48. An apparatus for cutting a workpiece comprising:

means for supporting a saw unit, said supporting means enabling said saw unit to move in a plane intersecting a surface of a table, wherein the saw unit comprises a saw blade and wherein the table is pivotally coupled to the saw unit, means for detecting movement of the saw blade in a plane intersecting the table surface, the detecting means being disposed proximally to the saw unit, means for releasably locking said saw unit so as to only allow the movement in a plane intersecting the table surface, and wherein the detecting means is connected to the releasable locking means, and wherein the releasable locking means prevents a movement of the saw unit in a plane parallel to the table surface.

* * * * *